United States Patent [19]

Varano et al.

[11] Patent Number: 5,385,255
[45] Date of Patent: Jan. 31, 1995

[54] SNAP-ON LID

[75] Inventors: Richard F. Varano, Forestville; Donald Kramer, Kensington, both of Conn.

[73] Assignee: Sherwood Tool, Inc., Kensington, Conn.

[21] Appl. No.: 156,294

[22] Filed: Nov. 23, 1993

[51] Int. Cl.6 .............................................. B65D 41/16
[52] U.S. Cl. ...................... 220/306; 220/308; 220/380; 220/356; 229/125.25
[58] Field of Search ............... 220/229, 306, 308, 253, 220/254, 309, 356, 367, 380; 215/321, 349, 326, 324; 229/125.25, 125.27, 906.1; 206/508

[56] References Cited

U.S. PATENT DOCUMENTS

| | | | |
|---|---|---|---|
| 1,227,338 | 5/1917 | Steffan | 220/308 |
| 1,646,765 | 10/1927 | Ramsey . | |
| 1,845,421 | 2/1932 | Klist | 215/326 |
| 1,919,574 | 7/1933 | Schmidt | 220/306 |
| 2,069,213 | 2/1937 | Carew | 229/125.25 |
| 2,135,752 | 11/1938 | Jones . | |
| 2,259,856 | 10/1941 | Moore . | |
| 2,306,973 | 12/1942 | Mysels . | |
| 2,493,086 | 1/1950 | Reifsnyder . | |
| 2,926,812 | 3/1960 | Wilcox | 220/356 |
| 2,957,595 | 10/1960 | White et al. . | |
| 3,081,904 | 3/1963 | Pipes | 220/306 |
| 3,155,261 | 11/1964 | Acton et al. . | |
| 3,338,468 | 8/1967 | Wilson | 220/380 |
| 3,360,119 | 12/1967 | Mullinix | 229/125.25 |
| 3,402,874 | 9/1968 | Sternau . | |
| 3,931,890 | 1/1976 | Davis | 206/508 |
| 4,194,645 | 3/1980 | Zabner et al. | 220/380 |
| 4,856,674 | 8/1989 | Berney | 220/380 |
| 4,886,184 | 12/1989 | Chamourian | 206/508 |

FOREIGN PATENT DOCUMENTS

| | | | |
|---|---|---|---|
| 446947 | 3/1948 | Canada | 215/326 |
| 1428577 | 1/1966 | France | 215/321 |
| 2621121 | 11/1977 | Germany | 220/229 |

Primary Examiner—David T. Fidei
Attorney, Agent, or Firm—McCormick, Paulding & Huber

[57] ABSTRACT

A disposable biodegradable snap-on lid for a recappable annular walled paper container having an annular rim around its upper open end. The lid has a top wall and a depending annular skirt formed by the downward extension of the top wall. The lower portion of the skirt is turned inwardly and upwardly and defines an annular locking ring within the skirt spaced upwardly from the lower end of the downwardly open skirt. The locking ring is sized for snap-over engagement with the rim on the container to releasably secure the lid in capping relation to the container. The annular opening at the lower end of the skirt is sized to receive therein and complement the upper end portion of another lid of like kind to facilitate stacking for dispensing and packaging concepts.

22 Claims, 2 Drawing Sheets

SNAP-ON LID

BACKGROUND OF THE INVENTION

This invention relates in general to container closures and deals more particularly with an improved disposable biodegradable snap-on lid for an annular walled paper container.

Snap-on lids which permit reclosure of disposable containers are well known in the disposable container art. Such lids have enjoyed widespread use in the fast food service industry for serving both hot and cold foods and beverages. The resilient plastic materials usually used in making such lids are relatively inexpensive and may be readily molded into intricate shapes. However, experience has proven that there are serious disadvantages associated with the use of such materials in the manufacture of disposable containers. Such plastic materials are generally not biodegradable or readily recyclable and present difficult disposal problems. Public recognition of the importance of environmental preservation has created a demand for environmentally friendly substitute products. The present invention is concerned with these problems.

Accordingly, it is the general aim of the present invention is to provide an improved snap-on container lid for low cost manufacture from environmentally friendly materials. It is a further aim of the invention to provide a versatile basic snap-on lid which may be furnished for use with either hot or cold recloseable food or beverage containers and the like.

SUMMARY OF THE INVENTION

In accordance with the present invention a biodegradable snap-on lid is provided for use with an annular walled paper container having an open upper end and an outwardly extending annular rim. The lid has a top wall and a depending annular skirt which includes an outer ply having inner and outer faces and constituting a continuation of the top wall. The outer ply defines a first portion which extends downwardly from the top wall and a second portion connected to the first portion. The outer ply also has a downwardly extending third portion connected to the second portion. The skirt further includes an inner ply turned inwardly and upwardly from the lower end of the third portion and constituting an upward continuation of the third portion. The inner ply extends upwardly along the inner face of the third portion and defines a downwardly open lower end of the skirt. An inwardly directed annular retaining ring formed by a part of the inner ply turned inwardly and then outwardly onto itself and spaced upwardly from the lower end of the skirt defines an opening sized for resilient snap-over engagement with the annular rim of the container to releasably retain the lid on the container to form a closure for the upper end of the container.

DETAILED DESCRIPTION OF PREFERRED EMBODIMENTS

Figures 1, 2:
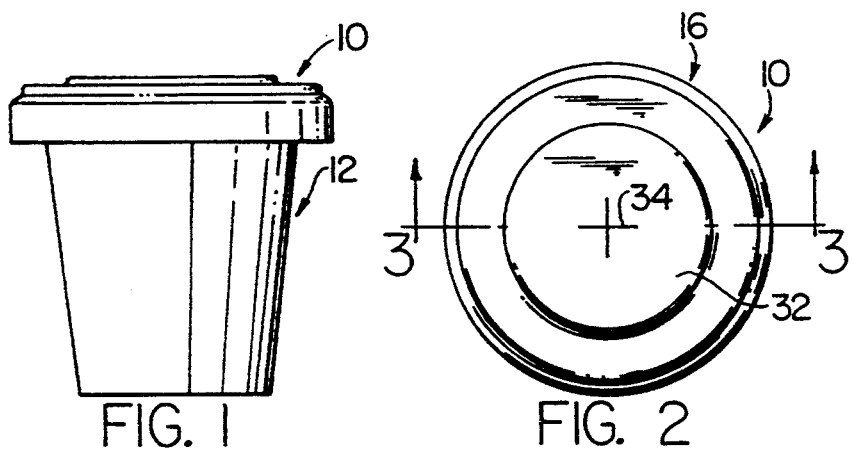
FIG. 1 is a side elevational view of a container assembly embodying the present invention.
FIG. 2 is a top plan view of the container asssembly shown in FIG. 1.
Figure 3:
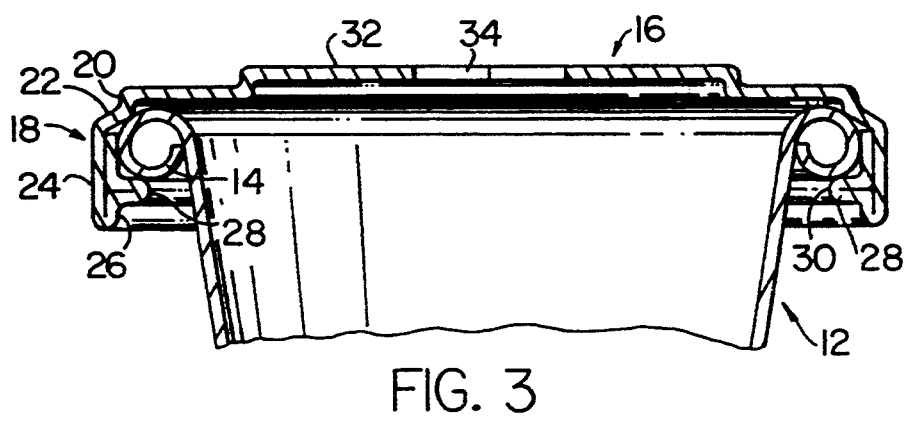
FIG. 3 is a fragmentary sectional view taken along the line 3—3 of FIG. 2.

Turning now to the drawings and referring first particularly to FIGS. 1–3 a disposable biodegradable snap-on lid embodying the present invention and indicated generally by the reference numeral 10 is shown attached to a disposable annular walled paper container designated generally by the numeral 12. The illustrated container 12 is a standard tapered container of a type well known in the container art and having a circular opening at its upper end and a radially outwardly curled circular rim 14.

The illustrated snap-on lid 10, hereinafter also referred to as the basic lid, is a single disk lid made from a single sheet of biodegradable material, preferably paper, and has a top wall indicated generally at 16 and a depending annular skirt designated generally by the numeral 18 and constituting a continuation of the top wall 16. The skirt 18 comprises an outer ply which includes inner and outer faces and has a cylindrical first portion 20 which extends downwardly from the top wall 16. A second portion of the skirt, indicated at 22, extends downwardly and outwardly from the lower end of the first portion 20. The illustrated second portion 22 is defined by a conical surface of revolution which diverges downwardly from the lower end of the first portion, substantially as shown. A generally cylindrical third portion 24 defines the lower end portion of the outer ply and extends downwardly from the lower end of the second portion 22.

The annular skirt 18 also has an inner ply 26 connected to the lower end of the third portion 24 and turned inwardly and upwardly from the third portion. The inner ply 26 extends upwardly along the inner face of third portion and defines a downwardly open lower end of the skirt 18. The inner ply also defines an inwardly directed annular retaining portion or locking ring 28 spaced upwardly from the lower end of the skirt. More specifically, the inner ply is turned radially inwardly and then radially outwardly onto itself to form the two-ply radially inwardly directed and generally circular locking ring 28. This retaining portion or locking ring is spaced upwardly from the lower end of the skirt and has an inside diameter 30 which is slightly smaller than the outside diameter of the circular rim 14 for resilient snap-over engagement with the rim 14 to releasably retain the lid 10 on the container 12. The inner ply terminates at an upper end disposed along the inner face of the third portion 24 at a location above the locking ring 28. Preferably, and as shown the upper end of the inner ply terminates proximate the lower end of the second portion 22 or proximate the junction of the second and third portions 22 and 24.

The top wall 16 has a raised portion 32 spaced annularly inwardly from the skirt 18. This raised portion may take various forms, however, the illustrated raised portion has a circular configuration, as viewed from above, and is coaxially aligned with the circular top wall 16, substantially as shown in FIG. 2. The purpose of this raised portion 32 will be evident from the further disclosure which follows. When the basic lid 10 is to be used as a cover for a cold beverage container or the like a cross-cut 34 is preferably provided, preferably centrally of the lid, to permit a drinking straw (not shown) to be inserted into the container 12.

The lid 10, shown in FIGS. 1-3, may be removed from the cup 12 by pulling upwardly on the lower edge of the skirt 18 relative to the cup so that the combined resilience of the lid and the cup rim 14 allows the locking ring 28 to snap upwardly over the cuffed rim 14. The illustrated container assembly 10 is recloseable and may be closed by forcing the lid 10 downwardly onto the upper end of the cup so that the locking ring 28 snaps downwardly over the curled rim 14 to attain the position shown in FIG. 3 of the drawing.

Figure 4:
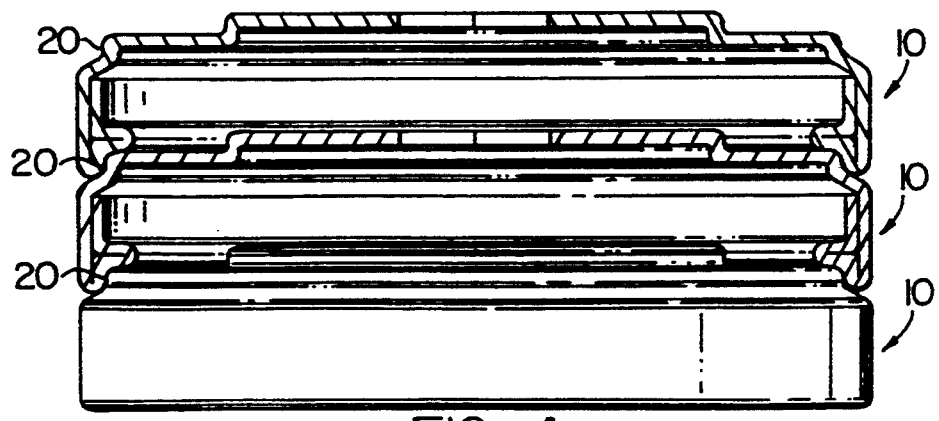
FIG. 4 is a side elevational view of a nested stack of snap-on container lids shown partially in axial section.

The basic lid 10 is particularly adapted for stacking or nesting with other lids of like kind for use in dispensing and/or packaging concepts. This stacking feature is illustrated in FIG. 4 wherein a plurality of lids 10, 10 are shown arranged in vertically stacked relation to each other. It will be noted that the open lower end of each lid 10 is sized to receive therein and substantially complement the first portion 20 of another lid 10 positioned therebelow. More particularly the inside diameter of the opening at the lower end of the skirt 16 is substantially equal to the outside diameter of the first portion 20 to receive the first portion 20 of another lid 10 therein which facilitates vertical stacking or nesting.

Figure 5:
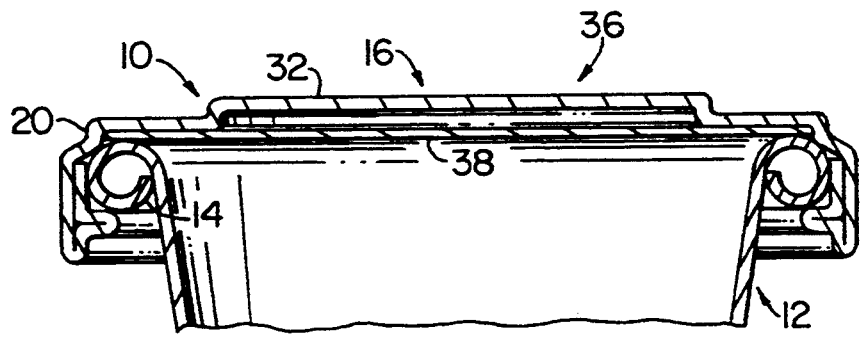
FIG. 5 is similar to FIG. 3 but shows another container assembly embodying the invention.

In FIG. 5 there is shown another container assembly which includes a cup 12 and a snap-on lid assembly indicated at 36. The illustrated lid assembly 36 is particularly adapted for use with a hot food or beverage container and is formed by fitting the basic lid 10 With an insert or inner disk 38 which cooperates with the top wall 16 and more particularly the raised portion 32 to provide an insulated closure for the associated container or cup 12. The insert or disk 38 is disposed below the top wall 16 and within the first portion 20 and is or may be secured to the top wall by ultrasonic welding or other suitable means. It will be noted that the basic lid 10 used to form the lid assembly 36 does not include a straw cross cut.

Figure 6:
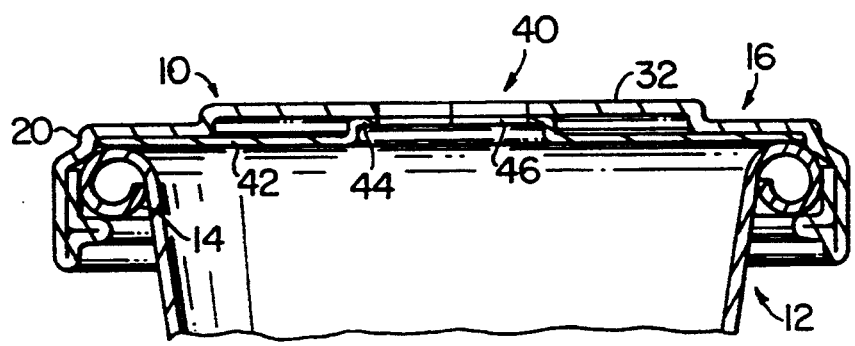
FIG. 6 is similar to FIG. 3 and shows still another container assembly embodying the invention.

Another container assembly which includes an insulated lid assembly is shown in FIG. 6. The insulated lid assembly indicated generally by the numeral also embodies the basic lid 10 and includes an insert 42 disposed below and in engagement with the top wall 16 and received within the skirt portion 20. The insert 42 has an elevated central portion 44, the upper surface of which is disposed in engagement with the lower surface of the raised portion 32. The upper surface area of the elevated portion 44 is substantially smaller than the upper surface area of the raised portion 32. The elevated portion is preferably attached to the raised portion 32 by supersonic welding or other suitable means and cooperates with the raised portion 32 to impart structural integrity to the lid assembly. A straw cross cut 46 may be provided centrally of the lid assembly 40 substantially as shown where the container assembly is to be used to serve a cold beverage.

Figure 7:
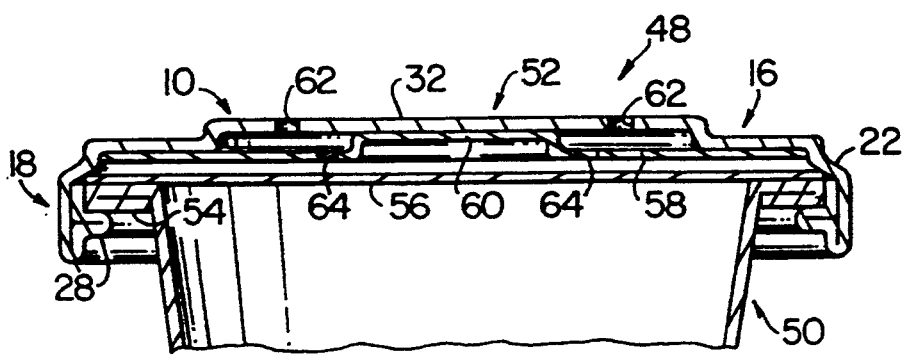
FIG. 7 is similar to FIG. 3 and shows a further embodiment of the invention.

In FIG. 7 there is shown a container assembly of another type embodying the invention and indicated generally by the reference numeral 48. The container assembly 48 is particularly suited for use in packaging a microwaveable food product, as, for example, a dehydrated product, such as soup, which is reconstituted by the addition of water. The container assembly includes an annular walled container indicated generally at 50 and an insulated lid assembly designated generally by the numeral 52. The illustrated container 50 differs somewhat from the container 12 previously described in that the outwardly extending rim indicated at 54, comprises a flat annular flange which provides a substantially large annular seating surface for adhering a foil or plastic membrane 56 is adhered. The membrane 56 forms an inner seal for the completed package. The flange 54 is formed by flattening an outwardly curled portion of the container sidewall to a desired flange configuration.

The lid assembly 52 is similar to the previously described lid assembly 40 in that it is formed from a basic lid 10 fitted with an insert 58 which has an elevated portion 60 spaced inwardly from the lid skirt 18 and which has a surface area substantially smaller than the surface area of the lid raised portion 32. The elevated portion 60 is preferably located centrally of the lid and, as shown, has a circular configuration, as viewed from above. The elevated portion 60 is preferably adhered to the underside of the raised portion 32 which adds to the structural integrity of the lid assembly 52. Preferably, and as shown, the lid top wall 16 has one or more vent openings 62 therethrough. The insert 58 also has one or more vent openings 64 out of vertical registry with the vent opening or openings in the lid top wall 16.

The lid assembly 52 is sized to trap the flange 54 between the lid second portion 22 and the locking ring 28 when the container 50 is capped by the lid assembly so that no substantial movement occurs between the lid assembly 52 and the container 50.

In using the product packaged within the container assembly 48 the lid assembly 52 is first removed from the container 50 as hereinbefore described. Thereafter, the membrane 56 is ruptured or otherwise removed from the container 50. Water may then be added to reconstitute the dehydrated product within the container. The container is then recapped with the lid assembly 52. The insulated vented lid assembly allows the reconstituted product to be heated in a microwave oven and served directly from the container, if so desired.

I claim:

1. A snap-on lid for a annular walled paper container having an open upper end and an outwardly extending annular rim around the open upper end, said lid having a top wall and a depending annular skirt having an outer-ply including inner and outer faces and constituting a continuation of said top wall, said outer ply having a first portion extending downwardly from said top wall and a second portion extending downwardly and outwardly from the lower end of said first portion, said outer ply having a third portion extending downwardly from the lower end of said second portion, said skirt having an inner ply constituting an upward continuation of said third portion and turned inwardly and upwardly from the lower end of said third portion, said inner ply extending upwardly along said inner face of said third portion and defining a downwardly open lower end of said skirt, said inner ply defining an inwardly directed annular retaining portion of said skirt formed by a part of said inner ply turned inwardly and then outwardly onto itself and disposed within said third portion and spaced upwardly from said lower end of said skirt, said annular retaining portion defining an opening sized for resilient snap-over engagement with the annular rim for releasably retaining said lid on the container to form a closure for the open upper end.

2. A snap-on lid as set forth in claim 1 wherein said inner ply terminates along said inner face of said third portion above said locking portion.

3. A snap-on lid as set forth in claim 2 wherein the upper end of said inner ply terminates proximate said lower end of said second portion.

4. A snap-on lid as set forth in claim 1 adapted to nest with another said snap-on lid wherein said open lower end is sized to receive therein and substantially complement said first portion of said another said snap-on lid.

5. A snap-on lid as set forth in claim 1 wherein said top wall has a raised portion spaced inwardly from said annular skirt.

6. A snap-on lid as set forth in claim 5 wherein said lid includes an insert disposed below said top wall and within said first portion.

7. A snap-on lid as set forth in claim 6 wherein said top wall has at least one vent opening therethrough and said insert has another vent opening therethrough out of vertical registry with said one vent opening.

8. A snap-on lid as set forth in claim 5 wherein said insert has an elevated portion spaced inwardly from said annular skirt and disposed in engagement with said raised portion and said elevated portion has an upper surface area smaller than the upper surface area of said raised portion.

9. A snap-on lid as set forth in claim 8 wherein said elevated portion is secured to said raised portion.

10. A snap-on lid as set forth in claim 6 wherein said insert is secured to said lid.

11. A snap-on lid for a annular walled paper container having a circular open upper end and a radially outwardly extending circular rim around the open upper end, said lid having a circular top wall and a depending annular skirt having an outer ply including inner and outer faces and constituting a continuation of said top wall, said outer ply having a cylindrical first portion extending downwardly from said top wall and a second portion defined by a conical surface of revolution diverging downwardly from the lower end of said cylindrical first portion, said outer ply having a cylindrical third portion extending downwardly from the lower end of said second portion, said annular skirt having an inner ply turned inwardly and upwardly from the lower end of said third portion and constituting a cylindrical upward continuation of said third portion, said inner ply turned radially inwardly and then radially outwardly onto itself forming a two ply radially inwardly directed generally circular locking ring portion of said skirt spaced upwardly from said lower end of said skirt, said circular locking ring portion defining a circular opening having a diameter smaller than the diameter of said circular rim and sized for resilient snap-over engagement with the circular rim to releasably retain said lid on the container and to form a closure for the open upper end.

12. A snap-on lid as set forth in claim 11 wherein said top wall has a raised portion spaced radially inwardly from said annular skirt and said lid includes an insert disposed below and in engagement with said top wall and within said first portion.

13. A snap-on lid as set forth in claim 12 wherein said insert includes an elevated portion spaced radially inwardly from said annular skirt and disposed in engagement with said raised portion and having an upper surface area smaller than the upper surface area of said raised portion.

14. A snap-on lid as set forth in claim 13 wherein said insert is secured to said lid.

15. A snap-on lid as set forth in claim 11 adapted to nest with another said snap-on lid kind wherein said open lower end is sized to receive therein and complement said first portion of said another said snap-on lid.

16. The combination comprising an annular walled paper container having an open upper end and an outwardly extending annular rim around said open upper end and a snap-on lid forming a releasable closure for said container, said lid having a top wall and a depending annular outer ply including inner and outer faces and integrally connected to and depending from said top wall, said outer ply having a first portion extending downwardly from said top wall and a second portion extending downwardly and outwardly from the lower end of said first portion, said outer ply having a third portion extending downwardly from the lower end of said second portion, an annular inner ply integrally connected to the lower end of said third portion and turned inwardly and upwardly from said lower end of said third portion, said inner ply extending upwardly along said inner face of said third portion and defining a downwardly open lower end of said lid, said inner ply turned inwardly and then outwardly onto itself forming a two ply inwardly directed annular locking portion spaced upwardly from said lower end of said lid, said annular locking portion defining an opening sized for resilient snap-over engagement with said annular rim for releasably retaining said lid on said container to form a closure for said open upper end.

17. The combination as set forth in claim 16 wherein said annular rim is further characterized as an outwardly curled rim.

18. The combination as set forth in claim 17 wherein said annular rim comprises a substantially flat flange.

19. The combination as set forth in claim 18 wherein said container includes a membrane extending across said open upper end and adhered to said flat flange forming an inner seal for said container.

20. The combination as set forth in claim 18 wherein said container has an annular sidewall and said flange is formed by a plurality of face-to-face plies constituting the outward extension of said sidewall.

21. A snap-on lid for annular walled paper container having an open upper end and an outwardly extending annular rim around the open upper end, said lid adapted to nest with another snap-on lid and having a top wall and a depending annular skirt having an outer ply including inner and outer faces and constituting a continuation of said top wall, said outer ply having a first portion extending downwardly from said top wall and a second portion connected to said first portion, said outer ply having a downwardly extending third portion connected to said second portion, said skirt having an inner ply constituting an upwardly continuation of said third portion and turned inwardly and upwardly from the lower end of said third portion, said inner ply extending upwardly along said inner face of said third portion and defining a downwardly open lower end of said skirt, said inner ply having a inwardly directed annular retaining portion formed by a part of said inner ply turned inwardly from the outer ply and then turned outwardly and onto itself and spaced upwardly from said lower end of said skirt, said annular retaining portion defining an opening sized for resilient snap-over engagement with the annular rim for releasably retaining said lid on the container to form a closure for the open upper end, said retaining portion cooperating with said second portion to retain said lid in fixed position relative to said container said open lower end sized to receive and generally complement the first portion of said another said snap-on lid.

22. A snap-on lid as set forth in claim 1 wherein said retaining portion cooperates with said second portion to releasably retain said lid in fixed position relative to the container.

* * * * *